UNITED STATES PATENT OFFICE.

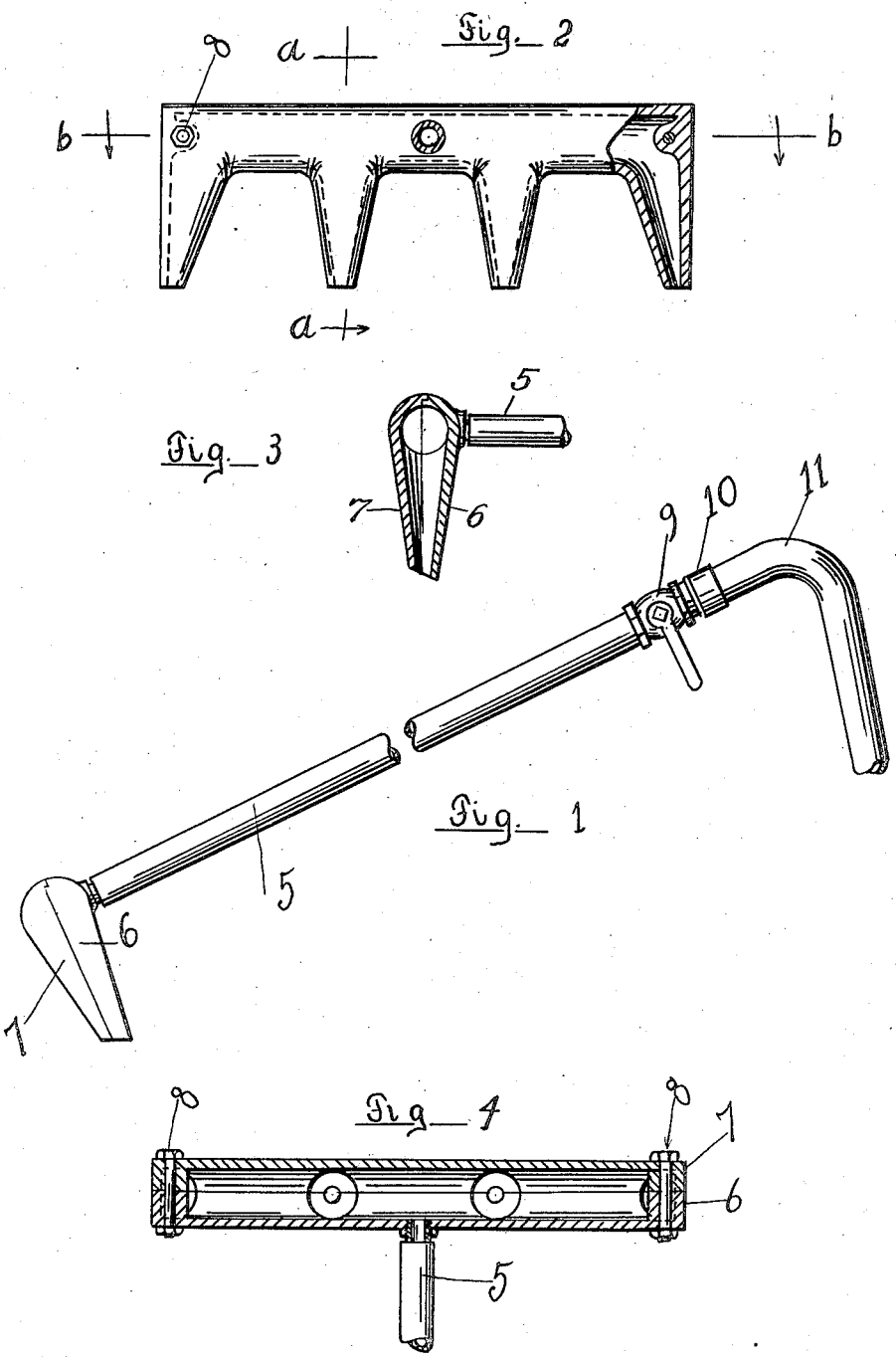

HARRY O. CLARKE, OF PASADENA, CALIFORNIA.

HAND CONCRETE-MIXER.

1,103,484.          Specification of Letters Patent.     Patented July 14, 1914.

Application filed September 17, 1912. Serial No. 720,756.

*To all whom it may concern:*

Be it known that I, HARRY O. CLARKE, a citizen of the United States, residing at Pasadena, California, have invented a new and useful Hand Concrete-Mixer, of which the following is a specification.

My invention relates to an implement for use in mixing concrete and other similar mixtures.

The object of the device is to provide an implement which may be used for the purpose of stirring and mixing the material as a hoe or a rake is now ordinarily used, and which will at the same time supply to the mixture the water necessary to render it of the desired consistency. My device has the maximum strength and durability. I have also provided a simple means for cleaning the passageways inside the implement when the same become clogged in any manner.

The means by which these beneficial results are attained are fully described herein and are shown in the accompanying drawings in which:

Figure 1 is a side view of the complete device. Fig. 2 is a rear view of the implement with the handle and a portion of one tooth broken away to more fully illustrate the construction. Fig. 3 is a transverse section taken on the line *a—a* in Fig. 2, and Fig. 4 is a section taken on the line *b—b* in Fig. 2, looking in the direction indicated by the arrows.

Throughout the several views like characters indicate like parts and referring to the details of construction, 5 is a tubular handle to which is attached the rake like head of the implement composed of the two members 6 and 7 which when in use are firmly held together by means of the bolts 8. The adjacent sides of the two members 6 and 7 are grooved in such manner that when the two members are bolted together continuous channels are formed leading from and communicating with the channel inside the tubular handle 5 and forming outlets in the end of each tooth.

9 is a regulating valve by means of which the flow of water is regulated as it enters the tubular handle 5.

10 is an ordinary female member of a hose connection permanently attached to the regulating valve 9 and adapted to receive the male member of the hose connection on the hose 11.

In use the implement is handled as a rake would be handled, except that when the mixture is properly dry mixed, water is added to the mixture through the hollow teeth, the flow being regulated by means of the valve 9.

In case rock, sand, gravel or any other material becomes lodged in the teeth, thereby interfering with the flow of water, the members 6 and 7 may be separated by removing the bolts 8 and the obstruction can be readily removed. This feature is of greatest importance. This form of construction also renders the device easy to construct by making it possible to cast the members, and they are preferably made of cast steel or other similar material.

Having thus described my device what I claim as new and desire to secure by Letters Patent is:

In a rake, the combination of a hollow handle; a head attached to said hollow handle and composed of two separable members having teeth formed thereon and having grooves in their adjacent sides which, when the members are fastened together, form passageways from the end of each tooth to and communicating with said hollow handle; means for fastening the members of said head together; and means for regulating the supply of fluid entering said handle.

HARRY O. CLARKE.

Witnesses:
 EMIL MENHOF,
 ANDREW K. MARTELL.